Oct. 24, 1933.  H. LUNDQUIST  1,932,223
MACHINE FOR MAKING SAW BLADES
Filed Feb. 6, 1930   2 Sheets-Sheet 1
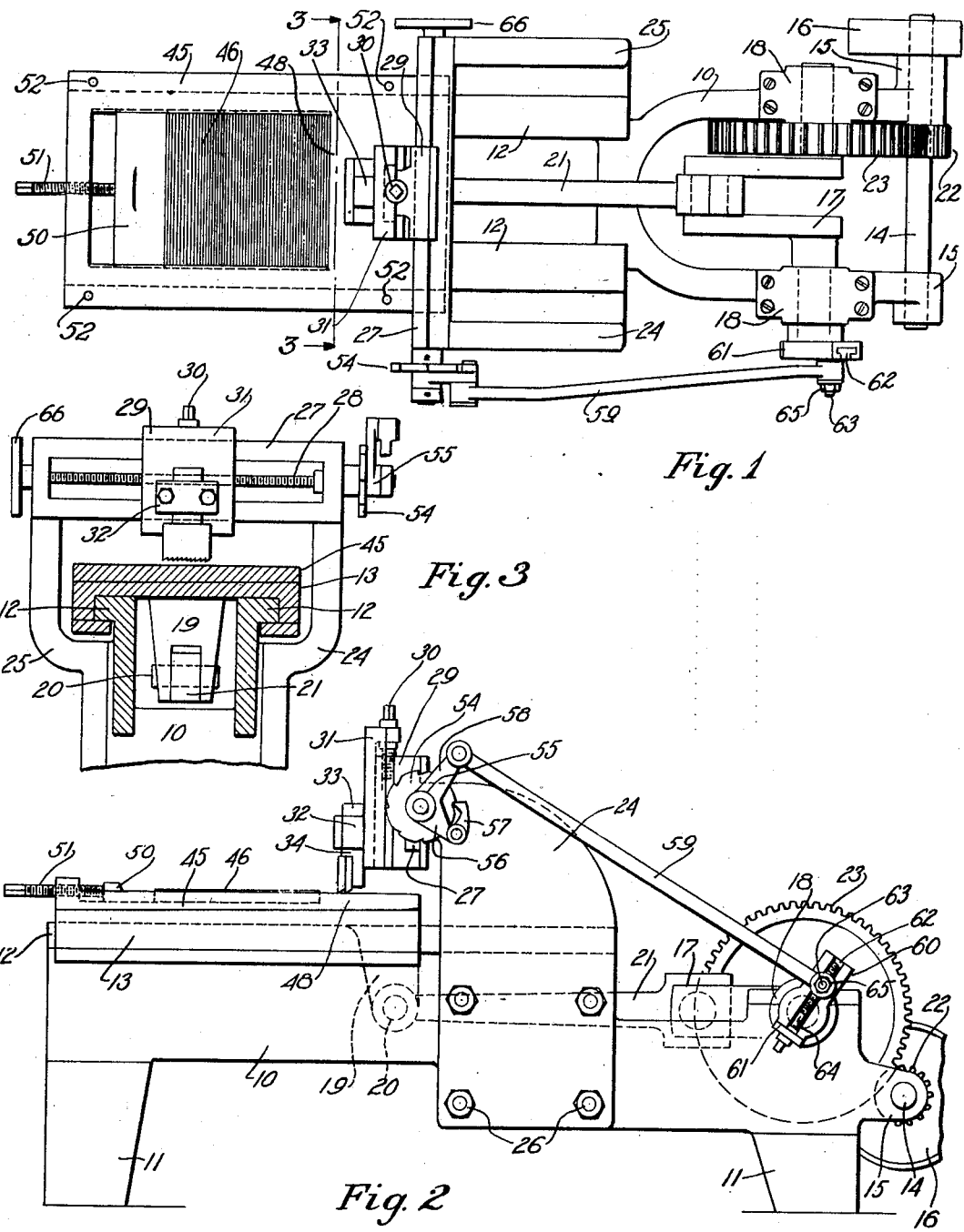
INVENTOR.
Hilding Lundquist
BY
ATTORNEY Oct. 24, 1933.  H. LUNDQUIST  1,932,223
MACHINE FOR MAKING SAW BLADES
Filed Feb. 6, 1930  2 Sheets-Sheet 2
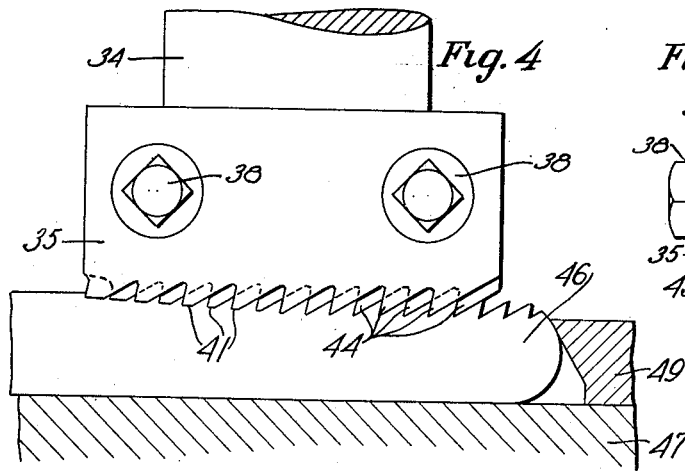
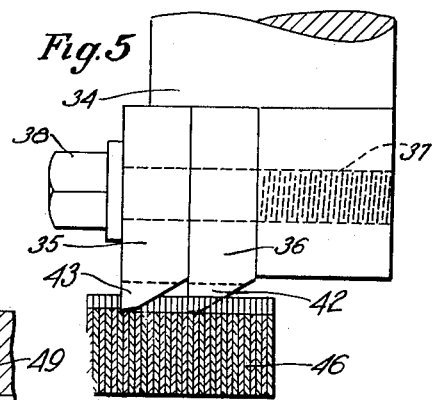
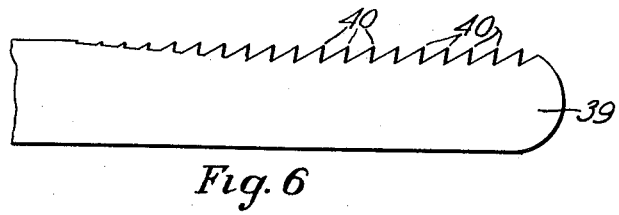
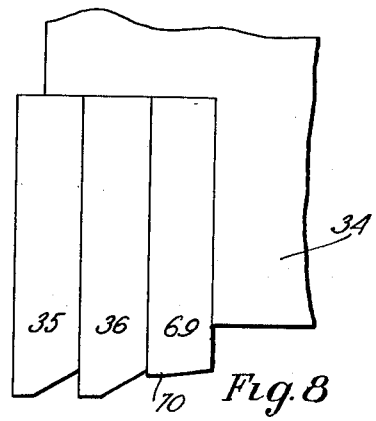
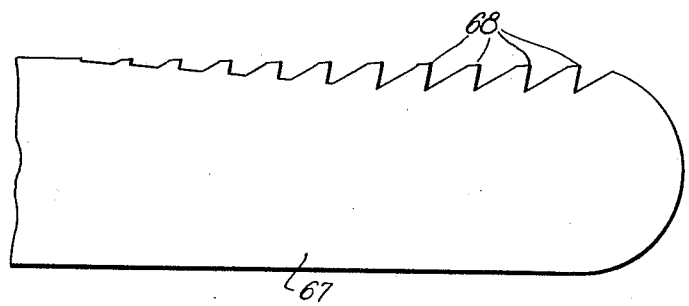
INVENTOR
*Hilding Lundquist*
BY
ATTORNEY Patented Oct. 24, 1933

1,932,223

UNITED STATES PATENT OFFICE 1,932,223

MACHINE FOR MAKING SAW BLADES

Hilding Lundquist, Bridgeport, Conn., assignor to Harold S. Forsberg, Stratford, Conn.

Application February 6, 1930. Serial No. 426,302

10 Claims. (Cl. 76—25)

This invention relates to new and useful improvements in means and methods of making saw blades.

An object of the invention is to provide an improved method whereby saw blades of superior quality may be economically manufactured.

Another object is to provide an improved method whereby straight saw blades having under-cut teeth may be economically manufactured.

A further object is to provide an improved means whereby saw blades of superior quality may be economically manufactured.

Yet another object is to provide an improved means whereby straight saw blades having under-cut teeth may be economically manufactured.

Another object is to provide an improved means for manufacturing saw blades, the means including a tool having a series of teeth a portion of which are of gradually increased depth and are followed by a plurality of teeth which are complete teeth, the shape of the tooth that it is desired to cut.

A further and more specific object is to provide a method of forming saw teeth, the method including a step consisting in moving either a cutter or the saw blank so that the cutter passes in a straight line through the blank.

An additional object is to provide a method of forming saw blades wherein the teeth of the blade are gradually cut to their desired shape and depth by a series of operations.

Yet a further object is to provide an improved means and method of forming saw blades wherein a tool, having cutting teeth of gradual increasing depth followed by a plurality of cutting teeth of the complete depth of the teeth to be cut, cuts in a straight line laterally through a blank in which the teeth are to be cut and after each cutting operation is moved forward along the blank a distance less than the length of that portion of the tool occupied by the full size teeth, whereby the full size teeth have a filing or honing action on the teeth as they are finished.

Additional objects and advantages will become apparent from the following detailed description taken in connection with the accompanying drawings. However, it is to be understood that the invention is not limited to the details shown, since the drawings and description are for the purpose of illustrating and making clear the construction and operation of a satisfactory embodiment of one means for carrying out the invention and utilizing the improved method. Therefore, reference must be had to the annexed claims for a definition of the limitations of the invention.

The invention will be illustrated and described with particular relation to hack saw blades although it is not to be understood that it is limited to such a blade and while a feature of the invention is the formation of the under-cut teeth in a straight saw blade, the invention is also equally applicable to the manufacture of saw blades which do not have under-cut teeth. Therefore, in the following specification and claims the term "saw blade" is used in a broad sense and is not used to refer to any particular type or kind of saw blade.

In the drawings:

Figure 1 is a plan view of the complete machine;

Fig. 2 is a side elevational view thereof;

Fig. 3 is a vertical sectional view on the line 3—3 of Fig. 1;

Fig. 4 is a detail view showing the tool, for making a saw blade, in operative relation with a blank;

Fig. 5 is an end view of the tool;

Fig. 6 is a view of a partially finished saw blade;

Fig. 7 is a front elevational view showing the tool arrangement for forming a power saw;

Fig. 8 is an end view of the same; and

Fig. 9 is a view of a partially processed power saw blade.

Referring in detail to the drawings, the means of the present invention includes a bed or body 10 supported on legs or uprights 11. Body 10 is in the form of a frame and includes the upper flanges or guides 12 on which is disposed a table or slide 13. Table 13 is channelled as best shown in Fig. 3 to embrace the guides 12.

According to one embodiment of the invention the table 13 is reciprocated on the bed 10 and to this end suitable means is provided at the rear of the bed. Such means includes a power or driven shaft 14 mounted in bearings 15 and driven, for example, as by a pulley 16. A crank shaft 17 is also mounted in bearings 18 on the bed 11.

At its rear end the table 13 is provided with a depending arm or lug 19 to which is pivotally connected as at 20 one end of a pitman rod 21, the other end of which is connected to the crank of shaft 17 as shown most clearly in Fig. 1. Motion from shaft 14 is transmitted to crank shaft 17 through a small gear 22 on shaft 14 to a larger gear 23 on shaft 17. From the foregoing it will be apparent that while shaft 14 is being driven, reciprocating movement will be imparted to table 13.

Arranged slightly in the rear of the foremost position of the table 13 are a pair of upright supports 24 and 25 secured to the bed 10 as by bolts 26. To the upper foreward edges of supports 24 and 25 is secured a horizontally disposed frame 27. Within frame 27 is a feed screw 28 and mounted on frame 27 and adapted to be fed thereacross by screw 28 is a block 29 on which is vertically adjustable, by means of a screw 30, a tool carrier block 31.

Block 31 includes a loop or other portion 32 adapted to receive and secure the shank 33 of a tool holder 34. As best shown in Figs. 4 and 5 the tools 35 and 36 are secured to the holder by passing them over bolts 37 and clamping them as by nuts 38. As will later be fully set forth the bolts bear a predetermined relationship to the tools 35 and 36 whereby the tools may be easily and quickly positioned on the holder 34.

In Fig. 6 is shown a partially finished saw blade 39. The saw teeth 40, that is those toward the right in this figure are finished teeth and it is to be noted that they are under-cut. The advantages of the under-cut teeth are numerous but will not be discussed in this specification.

Tools 35 and 36 are of like construction with the exception that the holes for the bolts 38 are so arranged that when the two tools are assembled in the holder 34 the teeth of tool 36 will be arranged between or to alternate with the teeth of tool 35.

Referring specifically to the teeth of the tools 35 and 36 it will be noted that these teeth are undercut whereby to cut the undercut teeth 40 in the saw blanks and that the teeth 41, that is those to the left in Fig. 4 are not complete teeth. However, the teeth 42 of tool 36 are clearly shown as arranged in alternate relation with the teeth 43 of tool 35. Also, it will be noted that the last four or five teeth that is, those toward the right in Fig. 4, numbered 44 of each tool are of full size.

A chuck or vise 45 is provided for holding the saw blanks 46 into which it is desired to cut saw teeth. These chucks may be provided in different sizes to accommodate saw blades of different lengths. Further, a number of such chucks may be provided in order that while one is in the machine a second may be ready to be loaded.

Chuck 45 as shown comprises a base 47 having a solid end wall 48 and under-cut side walls 49. The saw blanks are placed in the chuck in contacting relation with their ends engaged under the walls 49 as shown, whereby to assist in holding the blanks in place. When the chuck has been loaded a closure or gate 50 is forced into place by a screw 51 whereby to tightly clamp the blanks into tight engagement with each other. The chuck is secured to table 13 as by dowels 52.

From the drawings it will be apparent that the tools 35 and 36 each contain only a relatively few teeth and are not the length of a saw blade. Therefore, some means must be had for feeding the tools longitudinally of the saw blanks. Automatic means are provided for this purpose.

Such automatic means includes a ratchet or indexing wheel 54 secured to one end of feed screw 28 as shown. Rotatably mounted on the end of this feed screw is a crank 55 one arm 56 of which has pivotally secured to it a pawl 57 for engagement with the notches of the ratchet wheel 54. To the arm 58 of crank 55 is secured a link or rod 59 the other end of which is adjustably secured in a mounting 60.

This mounting comprises a bracket like member 61 secured to one end of crank shaft 17 and having a T-slot 62 as shown. Operating in the T-slot 62 is a T-bolt 63 to which the rod 59 is secured. A bolt or screw 64 is provided whereby the T-bolt 63 may be adjusted toward or from the axis of shaft 17 whereby to vary the throw rod 59 and the pawl 57. After proper adjustment of bolt 63 by screw 64 the bolt is locked in its adjusted position by nut 65.

In the operation of the machine, assuming that a chuck 45 has been loaded with saw blanks, and secured to table 13, the proper tools, for the desired saw are fitted in the holder 34. Here it is to be understood that tools are provided for operating on blanks to produce saws having varying number of teeth to the inch, as desired.

Now, assuming that the proper tools 35 and 36 are in the holder 34, a hand wheel 66 on feed screw 28 is operated to move the tool holder and position the tools at one end of the saw blanks. The machine is started and the first two unfinished teeth of each cutter engage the upper edges of the saw blanks 46 as they are carried beneath the tools and since the teeth of tool 36 split the metal passing between the teeth of tool 35, four unfinished teeth will be provided in the blanks.

The tools maintain their position during the reverse stroke of the table and when the table reaches the positions shown in Figs. 1 and 2, that is when the saw blanks are beyond the tools, pawl 57 is operated to move the ratchet or indexing wheel 54, in turn manipulating screw 28 and feeding the tools over or longitudinally of the saw blanks a distance equal to the distance between one, two or more teeth of the tools, as desired.

The operations described are repeated, until the tool has travelled the length of the saw blanks. It will be apparent that the tools cut laterally in a straight line through the saw blanks 46 and that the saw teeth are gradually formed. This has many advantages, not the least of which is that I am enabled to cheaply manufacture a straight saw blade having under-cut teeth. Such an advantage is due to the fact that the tool moves laterally in a straight line through the blanks, any number of which may be in the chuck at one time.

Owing to the method and means of forming the teeth the metal of the blanks is not torn away but is removed more as by a filing action. Also, the last four or five, or more if desired, teeth of each tool being complete, the finished teeth of the saws are repeatedly honed or smoothed since the complete teeth of the tool are repeatedly passed through the saw blank different complete tool teeth engaging the saw teeth as the machine is indexed. Too, the finished teeth toward the center of the cutter will become dull first and as one becomes dull the next adjacent tooth will begin cutting and in that way take the place of the dull tooth. From this it will be seen that complete teeth may be provided in the saw blanks with fewer sharpenings of the tools.

It will not be necessary to sharpen the tools until all of the complete teeth of the tools are worn. Also, it is to be noted that owing to the structural formation of the teeth, they may be easily and quickly sharpened, thus further reducing the cost of producing saw blades.

When making saws of the various standards with relation to the number of teeth per inch it is not necessary to modify the machine except with relation to the feed of screw 28. This is accomplished by substituting for the ratchet wheel 54, one having more or less notches depending upon whether finer or coarser teeth are to be cut. The proper ratchet wheel being in place nut 65 is loosened and screw 64 operated to correct the location of bolt 63 relative to the center of shaft 17 to correct the throw of rod or link 59. Tools 35 and 36 having finer or coarser teeth are of course substituted also.

In Fig. 9 is shown a partially processed power saw blade 67. The teeth 68 are finished, this blade being made on the same machine as blade 39 and by substantially the same process or method. It is to be noted that the points of teeth 68 are cut off at an angle whereby to strengthen the cutting edges of the teeth and provide additional clearance.

As already stated the same machine is used for making blade 67 as for making blade 39. The only change is that an additional tool 69 is employed. Teeth 70 of tool 69 are short and slightly inclined as at 71 whereby to cut away the points of the saw teeth at the incline shown on teeth 68 of Fig. 9.

Having thus described the invention, what is claimed is:—

1. In a machine for forming saw blades, a reciprocating table adapted to support and carry a plurality of saw blanks arranged side by side in contacting relation, a tool beneath which said table reciprocates, means stationarily mounting said tool, said tool comprising a pair of blocks each on its lower edge having a series of unfinished teeth of gradually increasing depth followed by a complete tooth, and said pair of blocks so relatively arranged that the teeth of one block are disposed in the rear of the teeth of the other block and in staggered relation thereto.

2. In a machine for forming saw blades, a reciprocating table adapted to support and carry a plurality of saw blades arranged side by side in contacting relation, a tool beneath which said table reciprocates, said tool being of less length than a saw blank, said tool being held against movement in the direction of movement of the table and adapted to cut teeth in the blanks as the table moves beneath the tool, indexing means for feeding the tool in a direction longitudinally of the blanks after each complete reciprocation of the table, said tool comprising forward and rearward teeth arranged in staggered relation whereby one splits the saw teeth formed by the other, and said tool including a cutting part to cut away the points of the teeth as they are formed on the saw blanks.

3. In a machine for forming saw blades, a reciprocating table adapted to support and carry a plurality of saw blanks arranged side by side in contacting relation, a tool beneath which said table reciprocates, said tool being of less length than a saw blank, said tool being held against movement in the direction of movement of the table and adapted to cut teeth in the blanks as the table moves beneath the tool, indexing means for feeding the tool in a direction longitudinally of the blanks after each complete reciprocation of the table, and said tool including a cutting part to cut away the points of the teeth as they are formed on the saw blanks.

4. In a machine for forming saw blades, a reciprocating table adapted to support and carry a plurality of saw blanks arranged side by side in contacting relation, means for securing the blanks to the table, said means including a chuck having portions overlying the upper edges of the end portions of the blanks, means clamping said blades in side by side contacting relation in said chuck, a tool above said table and in position to engage the blanks on reciprocation of the table, and means to reciprocate the table beneath the tool.

5. In a machine for forming saw blades, a reciprocating table adapted to support and carry a plurality of saw blanks arranged side by side in contacting relation, a tool beneath which said table reciprocates, said tool including means to cut teeth in said blades, and said tool including a part to cut away the points of the teeth as they are formed on the saw blanks.

6. In a machine for forming saw blades, a reciprocating table adapted to support and carry a plurality of saw blanks arranged in side by side contacting relation, a tool beneath which said table reciprocates, means mounting said tool against rotary movement, said tool including a portion having teeth formed thereon and adapted to cut teeth on said saw blanks as the saw blanks are reciprocated beneath the tool, and said tool including a portion having a part to cut away the points of the teeth as they are formed on the saw blanks.

7. In a machine for making saw blades, means for holding a plurality of blanks, a tool holder means, a tool supported by said tool holder means, means for moving one of said means relative to the other whereby teeth will be cut on said saw blanks, and said tool including a part to cut away the points of the teeth as they are formed on the saw blanks.

8. In a machine for forming saw blades, means for holding a plurality of saw blanks in side by side relation, a tool holder means, a tool supported by said tool holder means, means for moving one of said means relative to the other whereby to cut teeth on the saw blanks, said tool comprising independent blocks, one of said blocks on its lower edge including cutting teeth, and another of said blocks including a part to cut away the points of the teeth formed on the saw blanks.

9. In a machine for forming saw blades, means for holding a plurality of saw blanks, a tool holder means, a tool supported by said tool holder means, means for moving one of said means relative to the other whereby to cut teeth on said blanks, said tool comprising a pair of blocks each on their lower edges having a series of unfinished teeth of gradually increasing depth followed by a complete tooth, and said pair of blocks so relatively arranged that the teeth of one block are disposed in the rear of the teeth of the other block and in staggered relation thereto.

10. In a machine for forming saw blades, means for holding a plurality of saw blanks, a tool holder means, a tool supported by said tool holder means, means for moving one of said means relative to the other whereby to cut teeth on said blanks, and said tool comprising forward and rearward teeth arranged in staggered relation whereby one splits the saw teeth formed by the other.

HILDING LUNDQUIST.